June 23, 1931.  F. L. MORSE  1,811,207
DRIVE CHAIN
Filed Dec. 16, 1927
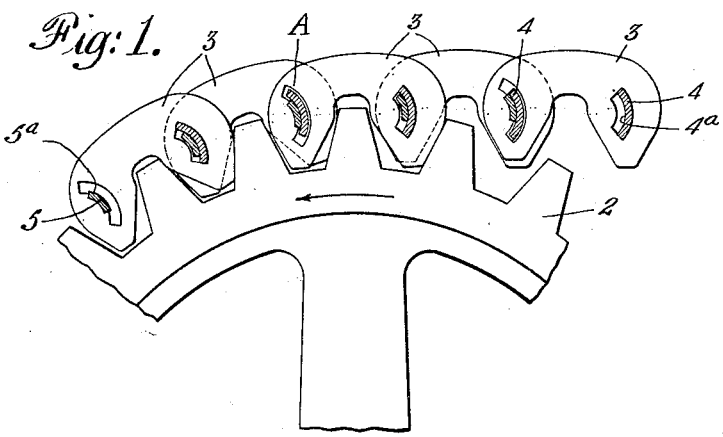
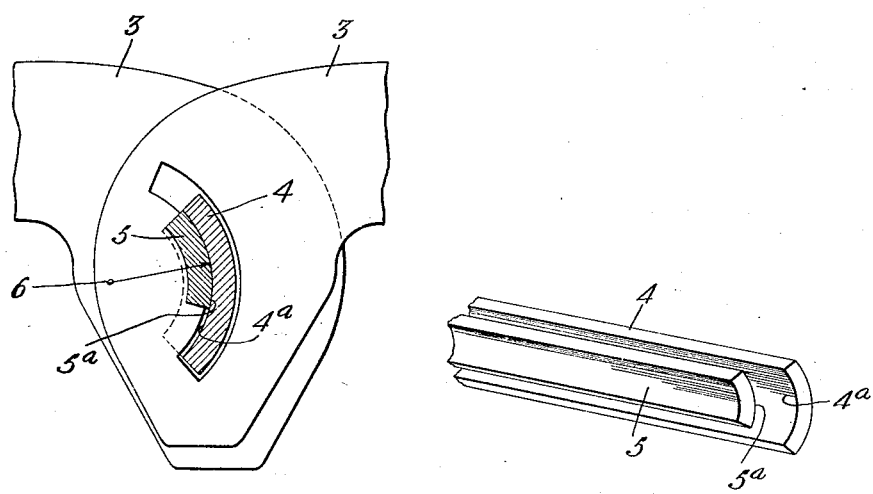
INVENTOR
Frank L. Morse
BY
Synnestvedt & Lechner
ATTORNEYS Patented June 23, 1931

1,811,207

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed December 16, 1927. Serial No. 240,378.

This invention relates to drive chains for the transmission of power, especially chains of the so-called silent type in which the links of the chain are composed of a plurality of plates, and is directed particularly to improvements in the joints thereof.

One of the primary objects of my invention is to improve the kinematic action of the joint by providing a more gradual transition from straight to rotary motion as the chain engages the sprocket and thus provide a quiet and smooth running chain.

More specifically stated, it is an object of my invention to direct and control the motion of the driving joint picked up by the sprocket tooth as the chain engages the sprocket, so that it is carried inwardly toward the sprocket in the initial stages of engagement to offset the normal outward motion, with the result that the chain in going from the straight run to the run over the sprocket takes a form more nearly curved than polygonal, whereby whipping is reduced and the shortening effect on the effective length of the chain is minimized.

Another object of my invention is to provide a chain of the above character which is adapted to resist shocks incident to such chains when operating at high speeds and in which wear at the joints is minimized.

How the foregoing, together with such other objects and advantages as may hereinafter appear, or are incident to my invention, are realized is illustrated in preferred form in the accompanying drawings, wherein—

Fig. 1 is an elevation, partly in section, of a portion of a chain and sprocket illustrating the invention;

Fig. 2 is a detail of a typical joint drawn on a larger scale; and

Fig. 3 illustrates a pair of pintle members as they would appear withdrawn from the chain.

Referring now to Fig. 1, the chain gear or sprocket 2, which, in this case, is assumed to be rotating in the direction shown by the arrow, is engaged by a chain composed of successive links 3, 3, etc. The chain is preferably of the silent type, and is built up by a large number of arch shaped link plates, whose overlapping ends are interspersed and connected by pintles which will be described, and can be built up to any desired width in the well known manner of such chains. In the drawings the end washers usually employed are omitted and the pintle parts are drawn in cross-section in order to clearly show their construction. The pintles comprise concave-convex pins 4 and 5 adapted to slide on each other, the convex surface 5a of pin 5 normally turning or sliding on the concave surface 4a of the pin 4. The centers of curvature of the concave and convex surfaces coincide and are preferably located ahead or on the forward side of the joint in the direction of rotation, i. e., the concave bearing surface of the pin 4 faces forward.

To understand the reason for facing the concave bearing surface forward, instead of backward, it must first be understood that the initial action of a sprocket when it engages a link is to carry the link slightly upward over the top of the sprocket and then downward around it. That is, a sprocket having a finite number of teeth drives as a many sided polygon, rather than strictly as a circle. While the initial motion of the concave pin 4 is slightly upward, the initial relative motion of the free portion of the chain attached to the cooperating convex pin 5 is downward, with the result that the upward tendency is compensated for and the initial impact and vertical whip of the chain reduced. Upon inspection of the joint designated by the reference letter A in Fig. 1, the relative position of the pintle parts after the pintle part 5 has moved downward will be seen. If the concave surface 4a was faced in the opposite direction, the joint would accentuate rather than neutralize the upward movement.

In the drawings I have shown the center of curvature of the surface 4a and 5a located at a point 6 (see Fig. 2), although any one of a number of points forward of the joint may be selected.

For example, the center may be located a distance of one half the pitch of the chain ahead of the surfaces to provide the desired smooth tangential engagement between the chain and sprocket.

However, a radius of curvature much beyond half the pitch exaggerates the very defects which a shorter radius of curvature would correct, and hence I have, as the preferred construction, shown a radius of curvature struck from a point located between the middle of the preceding tooth and the joint, though a radius of approximately half the pitch may be considered as a limiting condition.

It will be noted that the action is dependent primarily on the length of the radius of curvature, and it is not dependent on the inclination of the bearing surface, for the bearing may be tipped, but if the radius of curvature is not correct, it will not operate as described, while if correct, it will operate whether tipped or not, as in any case the sliding pin 5 will take its position at the deepest point of the pin 4.

The proper proportioning of the curvature of the bearing surfaces within the limits described is, therefore, an essential feature of the present condition and a chain having joints constructed in accordance therewith will have exceptionally smooth running qualities.

It is to be observed that the pintle parts 4 and 5 are relatively long and can extend across the width of the chain, as will be obvious from Fig. 3, thereby providing a maximum bearing surface in that direction. Also by employing pintle parts of the character described, the radius of curvature can be much greater than if they were circular, so that the thrust pressure is more evenly distributed, and also distributed over a larger area.

The pintle parts may be fixed or keyed against turning in their respective link plates 3, 3 in any suitable manner, for example, by having the backs and sides thereof fitted to holes correspondingly shaped, or by means of keys, thus preventing any cutting or wearing of the link plates on the pintle members. The wearing surface is located inside of the pintle.

While I have in the foregoing described one form of my invention, it will be understood that it is merely by way of illustration, and that it is susceptible to various modifications and adaptations as will be apparent to those skilled in the art without departing from the scope of the invention as defined by the following claims.

I claim:—

1. A drive chain comprising in combination, a series of links composed of plates having heads, a joint for pairs of said links comprising two pintle parts having complementary curved bearing surfaces, one part being non-rotative in the head of one link and the other part being non-rotative in the head of the adjacent link, the center from which the aforesaid curved bearing surfaces are struck being located at a point offset from the center of the head.

2. A drive chain comprising in combination, a series of links composed of plates having heads, a joint for pairs of said links comprising two pintle parts one having a concave bearing surface, and the other having a convex bearing surface complementary to the concave bearing surface of the other pintle part, one pintle part being secured in the head of one link and the other pintle part being secured in the head of the adjacent link, and the radius of curvature of said surfaces being less than the pitch of the chain and being located at a point offset from the center of the head.

3. A drive chain comprising in combination, a series of links composed of plates having heads, a joint for pairs of said links comprising a pin having a curved bearing surface, said pin being secured in one link, and a curved bearing surface for the adjacent link, said curved bearing surfaces being complementary to one another and the curvatures thereof being struck from a center forward of the center of the head.

4. A drive chain comprising in combination, a series of links composed of plates having heads, a joint for pairs of said links comprising two pintle parts having complementary curved bearing surfaces, one part being non-rotative in one link and the other part being non-rotative in the adjacent link, said pintle parts being of such length that said bearing surfaces extend from one side of the links to the other side thereof, the curvature of said surfaces being struck from a center located at a point forward of the center of the head.

5. In a multiplate drive chain, the combination of a series of links composed of plates having heads, joints for the links thereof adapted to move inwardly toward the sprocket as the chain goes from its straight run to its run over the sprocket, said joints including a pintle part secured against movement in a link of the straight run of chain, said part having a convex bearing surface; and a complementary concave bearing surface in the adjacent link engaged by the sprocket.

6. In a power transmitting chain, the combination of successive sets of links having overlapping ends, pintle members extending transversely through said ends and connecting the links together, said pintle members being in two parts, each of said parts being secured against rotation in its respective link, one of said parts having a concave bearing surface and the other having a convex bearing surface adapted to turn with sliding friction in said concave bearing surface, the center of curvature of said surfaces coinciding and lying forward of the bearing surfaces in the direction of motion of the chain and being offset from the center of the overlapping ends of the links.

7. In a power transmission chain, the combination of overlapping links having heads, joints for connecting the links at the heads, said joints including pintle parts having curved bearing surfaces engageable for sliding movement, the center of curvature being offset from the center of mass of the heads.

8. In a power transmission chain, the combination of overlapping links having heads, joints for connecting the links at the heads, said joints including pintle parts having curved bearing surfaces engageable for sliding movement, the center of curvature of said bearing surfaces being displaced from the center of the heads and located forward of the joints, so that the links, when the chain is bent, will be caused to move inwardly in the direction of bending.

In testimony whereof I have hereunto signed my name.

FRANK L. MORSE.